Oct. 4, 1960 E. W. VAN WINKLE 2,955,255
PRECISION SWEEP GENERATOR FOR PRODUCING LINEAR OR
SELECTED COMPLEX SWEEP FUNCTIONS
Filed March 8, 1954 3 Sheets-Sheet 1
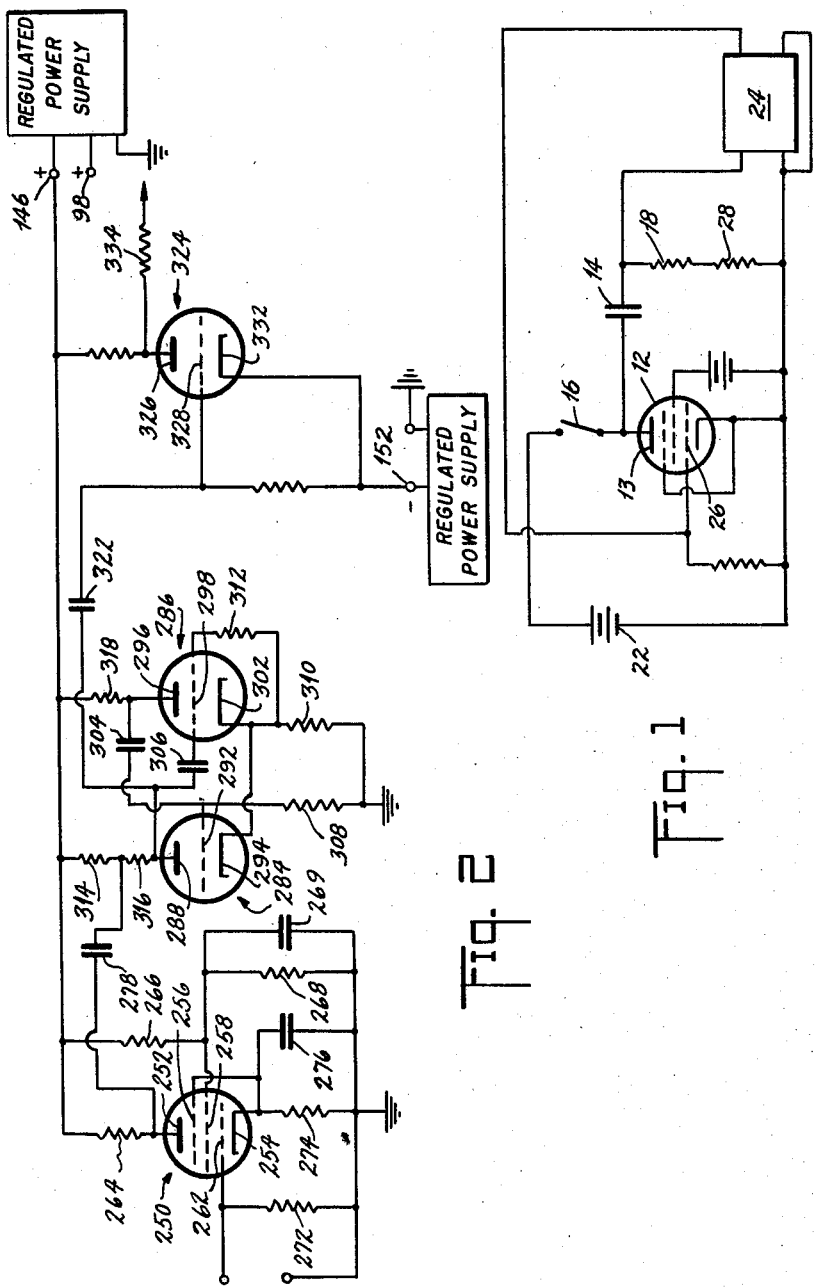
INVENTOR.
EDGAR W. VANWINKLE
BY George Sipkin
Lee I. Huntzberger
ATTORNEYS

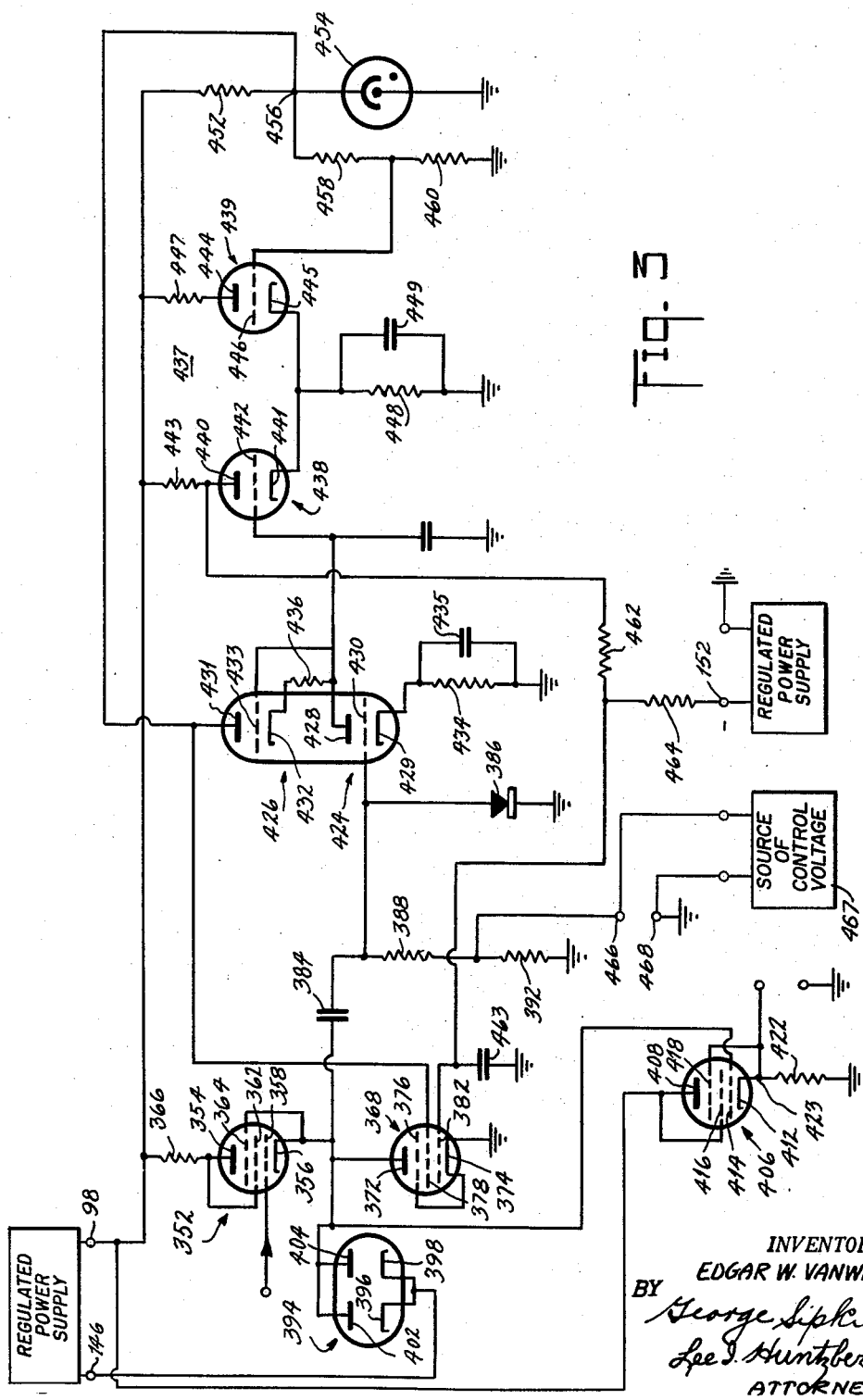

United States Patent Office 2,955,255
Patented Oct. 4, 1960

2,955,255

PRECISION SWEEP GENERATOR FOR PRODUCING LINEAR OR SELECTED COMPLEX SWEEP FUNCTIONS

Edgar W. Van Winkle, Rutherford, N.J., assignor to the United States of America as represented by the Secretary of the Navy Filed Mar. 8, 1954, Ser. No. 414,910

6 Claims. (Cl. 328—183)

This invention relates to a sweep generator and more particularly to a linear sweep generator characterized by excellent stability, freedom from noise, precision, and the ability to produce linear sweep voltage and selected non-linear sweep voltages. This invention fills a need for a sweep generator with a stability of one part in 10,000. The usual sweep generator has a stability around one part in 100 due to random circuit variations and a linearity of around 10%. Various special circuits have been devised to improve the basic sweep generator for use with radar equipment, but no circuit has been devised to approach the required stability nor to have a linearity as great as required. The disadvantages of previously devised circuits are poor stability and poor linearity. This invention overcomes both these difficulties.

A further object is to provide an improved linear sweep generator having excellent stability, freedom from noise, and precision.

A further object is to provide a linear sweep generator whose output voltage may be modified by a selected voltage suitably applied to the generator.

A further object is to provide a linear sweep generator whose output voltage may be modified to obtain any desired sweep rate function by injecting into the generator a voltage of suitable magnitude which is a derivative of the desired sweep voltage.

Other objects and many of the attendant advantages of this invention will be readily appreciated as the same becomes better understood by reference to the following detailed description when considered in connection with the accompanying drawings wherein:

Fig. 1 is a simplified schematic diagram of the basic invention,

Fig. 2 is a schematic diagram of the synchronizing pulse shaper and amplifier forming part of an embodiment of the invention, Fig. 3 is a schematic diagram of a linear sweep generator forming an embodiment of this invention.

Figure 4:
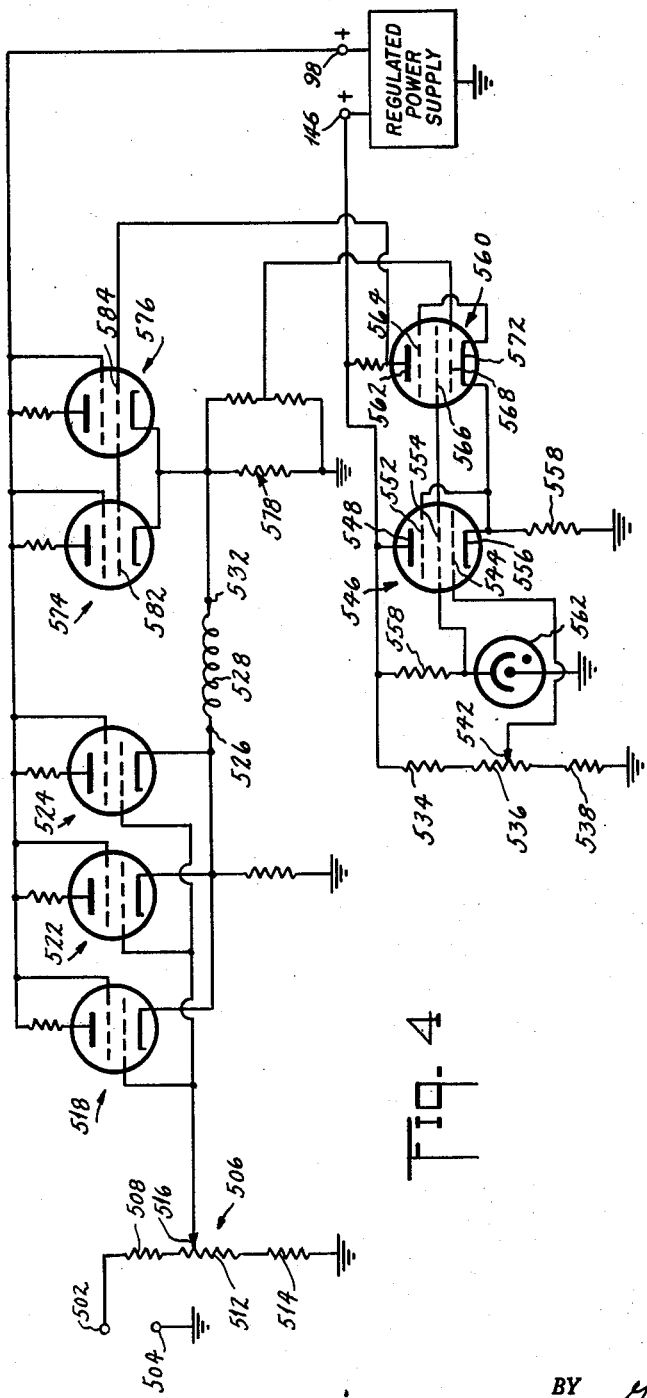
Fig. 4 is a schematic diagram of a sweep amplifier forming part of an embodiment of this invention.

In the circuit shown in the schematic diagram of Fig. 1 the basic elements comprising this invention are arranged in simplified form. In this simplified form a high plate resistance vacuum tube such as a pentode 12 has a plate 13 which is connected with a sweep capacitor 14 and switch 16. The switch 16 may be either a soft tube (thyratron) or hard tube type of switch. A small resistance 18 and 28 is connected in series with sweep capacitor 14.

It is well known that the voltage developed across a condenser C at any time T is given by the equation $V = 1/C \int_0^T i\,dt + V_0$ where $i$ is the current flow into the condenser and $V_0$ is the voltage on the condenser at $T=0$. If $i$ is constant then the voltage V is given by $V = V_0 + iT/C$. Accordingly, the sweep voltage V is a linear function of time. Attempts have been made in the past to accomplish this by utilizing the so-called constant current characteristic of a pentode, but they met with little success due to the fact that the pentode does not have a truly constant current characteristic. This invention eliminates that deficiency. In Fig. 1, switch 16 is closed at some time before $T=0$, charging sweep capacitor 14 to the voltage of battery 22. Switch 16 is opened at $T=0$ and sweep capacitor 14 begins to discharge through tube 12. The voltage across resistors 18 and 28 is proportional to the current $i$ flowing from sweep capacitor 14, and hence is proportional to the rate of change of voltage $dV/dt$ across the sweep capacitor. The voltage developed across resistors 18 and 28 is amplified by amplifier 24 the output of which is connected to the control grid 26 of tube 12. Thus, any change in current $i$ is accompanied by a change in the voltage impressed upon the grid 26 of tube 12 by the amplifier 24, and in such a sense as to oppose the change in current regardless of the initial cause of the change. By making the gain of amplifier 24 high enough, the resulting variation in current and hence the resulting variation in sweep rate may be made arbitrarily small. Thus the effects of variation in tube characteristic, filament temperature, and the like of the tube 12 are compensated for. A distinct advantage of this invention lies in the fact that the sweep rate may be readily controlled to provide a desired sweep function by applying a voltage across resistor 28, causing the voltage on the grid 26 of tube 12 to be different from that determined solely by the capacitor current flow through resistors 18 and 28 and thereby resulting in a different current flow through the pentode 12 from capacitor 14. The capacitor current is a linear function of the voltage impressed across resistor 28 because the amplifier 24 in combination with the control grid 26 of tube 12 acts to keep the voltage across resistors 18 and 28 constant. When a voltage is impressed across 28 the voltage across the resistors 18 and 28 has to remain constant whereby the capacitor current is changed accordingly depending upon whether the impressed voltage is positive or negative. Therefore, it is possible to obtain a sweep rate function which is linear with respect to the voltage impressed across resistor 28. Therefore, since the current flowing is a linear function of the voltage impressed across resistor 28 it is possible to obtain a sweep rate function which is linear with respect to the voltage impressed across resistor 28. In many cases, a completely arbitrary sweep function is required, as for example, a parabolic or hyperbolic function. Because the sweep current is a linear function of the voltage impressed across the resistor 28 that voltage is equal to $KdV/dt$ where K is a constant. Hence to obtain any desired sweep rate function, one merely uses a voltage which is a derivative of the desired sweep voltage and impresses it across the resistor 28.

In Fig. 2 there is shown a synchronizing pulse amplifier and shaper circuit for generating the trigger pulse for the sweep amplifier. The circuit includes a pentode 250 having a plate 252, a cathode 254, a suppressor grid 256 connected to the cathode 254, a screen grid 258 and a control grid 262. A screen grid bias resistor 268 is connected between the screen grid 258 and ground. A screen grid bypass condenser 269 is connected in shunt across the resistor 268. A grid-leak resistor 272 is connected between the grid 262 and ground. A cathode bias resistor 274 in parallel with a cathode bypass condenser 276 is connected between the cathode 254 and ground. The output of the pentode amplifier is coupled from the plate 252 through a coupling condenser 278 to a plate driven one-shot multivibrator.

The one-shot multivibrator includes a twin triode having triode sections 284 and 286. Triode section 284 includes a plate 288, a control grid 292 and a cathode 294. Triode section 286 includes a plate 296, a control grid 298 and a cathode 302. The grid 292 of the triode section 284 is coupled to the plate 296 of the triode section 286 through a coupling condenser 304. The grid 298 of the triode section 286 is coupled to the plate 288 of the triode section 284 through a coupling condenser 306. The grid 292 is additionally connected to ground through a resistor 308. Both cathodes 294 and 302 are coupled together and connected to ground through a cathode bias resistor 310. The grid 298 is connected to the cathode by a grid-leak resistor 312. The plate 288 of the triode section 284 is connected to the positive load terminal 146 of a regulated power supply (e.g. 250 volts) by means of a pair of resistors 314 and 316. The coupling capacitor 278 connected to the output of the amplifier pentode 250 is connected to the junction between the two resistors 314 and 316. The plate 296 of the other triode section 286 is connected to the power supply terminal 146 through a plate-load resistor 318 which has a lower value than the pair of resistors 314 and 316 in the circuit of the plate 288. The output of the multivibrator is derived at the plate 288 of the triode section 284. Normally the tube section 284 is cut off. Because no current normally flows in the grid resistor 312 the grid 298 is at zero bias with respect to the cathode 302. However, the cathode current of the tube section 286 flowing through the cathode bias resistor 310 is sufficient to cut off the tube section 284. However, when a positive pulse is coupled into the plate circuit of the section 284 between the resistors 314 and 316 it causes current to flow through the resistor 316 thereby coupling a negative going pulse through the capacitor 306 to the grid 298. The negative going pulse causes a decrease in current through the tube section 286 resulting in the simultaneous coupling of a positive going pulse to the grid 292. Due to a decrease of current flow to the cathode resistor 310 the potential of the grid 292 is further caused to increase relative to the cathode 294 so the result is that the tube section 284 conducts while the tube section 286 is cut off. However, the action now reverses because the potential of the grid 298 and the cathode 302 is the same, and the tube section 286 again begins to conduct, reversing the procedure previously described so that the tube 284 is again cut off and remains cut off until another positive pulse is coupled into the plate circuit of section 284. The negative going pulse at the plate 288 is passed through a coupling condenser 322 to the grid of the output amplifier. The output amplifier includes a triode 324 having a plate 326, a control grid 328 and a cathode 332. When the tube 324 is cut off the potential at its plate rises several hundred volts. This occurs when the regulated power supply terminal 146 is at the potential of plus 250 volts and the regulated power supply terminal 152 is at the potential of minus 150 volts. The quiescent operating potential of the plate in that case is in the vicinity of minus 50 volts. When the tube 324 is cut off by the incoming pulse the potential at the plate 326 rises from minus 50 to plus 250 or a rise of 300 volts. This pulse is coupled into the sweep generator circuit of Fig. 3 through the resistor 334.

In Fig. 3 there is shown the portion of the circuit generating the sweep voltage. The synchronizing pulse provided by the circuit of Fig. 2 is fed into the hard tube switch 352. The hard tube switch 352 is the equivalent of the one referred to at 16 of Fig. 1. The tube is a beam tetrode having a plate 354, a cathode 356, a control grid 358, a screen grid 362 connected to the plate 354, and shields 364 connected to the cathode 356. A plate load resistor 366 is connected between the plate 354 and the terminal 98 (e.g. 350 volts) of the regulated power supply. The sweep capacitor discharge current is controlled by a constant current pentode 368 connected between the cathode 356 of the tube 352 and ground.

The pentode 368 includes a plate 372, a cathode 374, a suppressor grid 376 connected to the cathode 374, a screen grid 378 and a control grid 382. The sweep capacitor is shown at 384. One side of the sweep capacitor 384 is connected to the junction between the cathode 356 of the tube 352 and the plate 372 of the tube 368. The other side of the capacitor 384 is connected to ground through a pair of parallel paths one of which includes a germanium diode 386 for a reduced time constant during charging and the other one of which includes a pair of resistors 388 and 392 which carry the discharge current of capacitor 384.

The beginning of the sweep is controlled by a double diode 394. The cathodes 396 and 398 of the double diode are connected to the terminal 146 of the regulated power supply. The plates 402 and 404 of the double diode 394 are connected to one side of the sweep capacitor 384. The voltage potential at the beginning of the sweep is controlled by the diode 394 to eliminate any variations of the voltage at the start of the sweep. The sweep start is thus as accurate as the power supply regulation at the cathode of this diode which is that at terminal 146.

The output tube is a triode-connected beam power tetrode 406 hooked up as a cathode follower. The tube 406 includes a plate 408, a cathode 412, a control grid 414, a screen grid 416 connected to plate 408, and shields 418 connected to the cathode 412. A cathode resistor 422 is connected between the cathode 412 and ground. The output of the circuit is derived at the terminal 423 of the resistor 422. The plate 408 of the output tube 406 is connected to the regulated power supply terminal 98.

The circuit is triggered by the input pulse to the grid 358 of the hard tube switch 352. The discharge current is controlled by the constant current pentode 368. The constant current pentode is controlled in a preferred embodiment of this invention by a modified Miller Feedback circuit. The sweep current of the capacitor 384 flows in resistors 388 and 392. The resulting voltage is amplified by a two-section tandem-connected amplifier including triode sections 424 and 426. The triode section 424 includes a plate 428, a cathode 429, and a control grid 430. The triode section 426 includes a plate 431, a cathode 432 and a control grid 433. Each of the triode sections 424 and 426 are cathode biased. The biasing means for the tube 424 includes a cathode resistor 434 shunted by a cathode bypass capacitor 435. The biasing means for the tube 426 includes a cathode resistor 436. The tandem-connected triode amplifier including the triode sections 424 and 426 is used for amplifying the voltage resulting from the capacitor current passing through the resistors 388 and 392. Because the triode sections 424 and 426 are connected in tandem they act to eliminate the effects of heater temperature fluctuations due to line voltage changes. Reference is made to page 464 of vol. 18 of Massachusetts Institute of Technology Radiation Laboratory Series, edited by Valley and Wallman and published by McGraw-Hill Book Co., 1948. The tandem connected amplifier is explained therein under the paragraph heading "Cancellation by a Series Triode."

The tandem connected triode amplifier is followed by a differential amplifier 437 which helps to cancel heater voltage variation. The differential amplifier 437 includes a double triode having a section 438 and a section 439. The tube section 438 includes a plate 440, a cathode 441, and a control grid 442. A plate load resistor 443 connects the plate 440 to the terminal 98 of the regulated power supply. An explanation of the differential amplifier is given in the same vol. 18 of the Radiation Lab. Series on pages 442–444 with Figs. 11–25 therein serving as an illustration for the explanation. The book explains how the differential amplifier provides a means of balancing heater voltage variation and how the output voltage is less effected by the "common-mode variation." The common-mode variation is the variation of D.C. level at the two inputs caused by a change of voltage at point 456 in Fig. 3.

The other section of the differential amplifier 437 includes a plate 444, a cathode 445, and a control grid 446. A plate load resistor 447 likewise connects the plate 444 to the terminal 98 of the regulated power supply. Both cathodes 441 and 445 are connected to ground through a common cathode bias resistor 448 shunted by a cathode bypass resistor 449.

A resistor 452 is connected in series with a voltage regulator tube 454 between terminal 98 and ground. The junction 456 between the resistor 452 and the voltage regulator 454 provides a source of fixed potential for the plate 431 of the tube section 426 of the tandem-connected triode amplifier and for the screen grid of the constant current pentode 368. Connected in parallel with the voltage regulator tube 454 between the terminal 456 and ground are a pair of identical resistors 458 and 460. The junction between the two resistors 458 and 460 provides a source of constant bias relative to ground for the grid 446 of the tube 439. The output of the differential amplifier 437 is derived at the plate 440 of the tube section 438 of the differential amplifier. The plate 440 of the tube section 438 is connected to minus 150 volts by a pair of identical high value resistors 462 and 464, connected in series with terminal 152. The junction of the two resistors 462 and 464 is connected to the control grid 382 of the constant current pentode 368 and to ground by a bypass condenser 463.

The operation of the sweep generator circuit is as follows: The capacitor 384 discharges through the pentode 368 producing a negative voltage across resistors 388 and 392. Any variation of this current is amplified by the tandem-connected triode amplifier including the tube sections 424 and 426 and the differential amplifier including the tube sections 438 and 439. The amplification takes place before the variation is applied to the pentode 368. For example, an increase of capacitor current produces a more negative bias at the grid 430. The latter produces a more positive voltage at the grid 442 and consequently a more negative voltage at the control grid 382 of the pentode 368. The latter causes an effective increase in the plate resistance of the tube and thereby a decrease in the capacitor current. In other words, even slight changes in the discharge current of capacitor 384 is opposed. The described arrangement affords the sweep generator with excellent stability, precision, and freedom from noise.

A control voltage input is adapted to be injected in series with the voltage developed across the resistors 388 and 392 by connecting a suitable voltage source 467 to the terminals 466 and 468 which are across the resistor 392. By injecting a positive voltage such as four volts or less between the terminals 466 and 468 a change in the sweep rate is obtained. A more positive voltage produces a faster sweep. The sweep is at all times the integral of the injected voltage and by using the correct form the voltage inserted between terminals 466 and 468 can be utilized to generate special non-linear sweeps.

The return trace of the sweep is determined by the shape of the pulse used. The return trace can be made as short as .1% of the sweep time without damage to the trigger tube 352. The pulse shaping circuit as previously described in connection with Fig. 2 consists of an amplifier 250 coupled to a plate-driven one-shot multivibrator. The time constants of the multivibrator are chosen to give the desired return trace time. The output of the one shot gives a 50 volt negative pulse which is coupled to the amplifier 324. The amplifier grid 328 and cathode 332 are returned to a regulated load voltage supply of minus 150 volts. The quiescent plate voltage with the plate supply being a regulated load voltage of 250 volts is minus 50 volts. The pulse on the multivibrator cuts off the amplifier tube 324 and brings the plate voltage to 250 volts. This 300 volt pulse is applied to the trigger tube 352 of Fig. 3 to charge up the sweep capacitor. The voltage at the cathode 356 of the trigger tube 352 of Fig. 3 is used to charge up the sweep capacitor. The voltage at the cathode 356 of the trigger tube 352 rises to about 300 volts for the duration of the pulse. At the end of the pulse the capacitor discharges through the double diode 394 at a rate set by the size of the capacitor 384 and the resistance of the diode 394. This time is of the order of a few microseconds.

In Fig. 4 there is shown the amplifier for the linear sweep generator of Fig. 3. The output of the linear sweep generator is applied to the input terminals 502 and 504 of the output amplifier. A gain control 506 is connected across the input terminals 502 and 504. The gain control comprises a resistor 508 in series with a potentiometer 512 and a resistor 514. The tap 516 of the potentiometer 512 is connected to the grid circuits of the amplifier tubes. The amplifier tubes include a plurality of beam power amplifiers 518, 522, and 524. The plurality of beam-power amplifier tubes are connected in parallel as a cathode follower. A plurality of tubes is used for the purpose of carrying the necessary load current. The output of the cathode follower comprising the three beam-power amplifier tubes 518, 522, and 524, is connected to one terminal 526 of the deflection yoke 528. The other terminal 532 of the deflection yoke 528 is connected to a position control circuit. The position control circuit includes a position control resistance means having a resistor 534, a potentiometer 536 and a resistor 538. The tap 542 on the potentiometer 536 is connected to the control grid 544 of the pentode 546. The pentode 546 further includes a plate 548, suppressor grid 552, a screen grid 554 and a cathode 556. A resistor 558 and a voltage regulator tube 562 are connected in series between the regulated voltage terminal 146 and ground to provide a fixed positive potential for the screen grid 554. The cathode 556 is connected to ground through a cathode resistor 558. A second pentode is provided at 560 and includes a plate 562, a suppressor grid 564, a screen grid 566, a control grid 568, and a cathode 572. The suppressor grid 564 is connected to the cathode 572. The cathodes 556 and 572 of the two pentodes are connected together as are the screen grids 554 and 566. The control grid of the pentode 560 is connected to a voltage divider that is connected between ground and the terminal 532 of the deflection yoke 528. By varying the position of the tap 542 the potential on the control grid 544 of the pentode 546 is thereby increased or decreased to control the current flow through the cathode resistor 558 accordingly. If the current flow through the cathode resistor 558 is increased the potential of the cathode 572 is raised with respect to the grid 568 causing a decrease in current flow through the pentode 560. This variation in the current causes a change in the plate potential at 562. This change is communicated to the control grids 582 and 584 of a pair of beam-power tubes 574 and 576. The current through both tubes 574 and 576 passes through cathode resistor 578 whereby an increased current flow causes the potential of the terminal 532 to rise and conversely a decreased current flow causes the potential of terminal 532 to drop. By transferring the potential change at the plate 562 to the grids 582 and 584 of the beam power tubes 574 and 576 the potential of terminal 532 is thereby raised or lowered.

The sweep generator circuit described is a solution for a stable linear integrator. The sweep output voltage is large enough to eliminate need of further amplification which cannot be done without degradation of the signal. Power amplification is obtained by cathode followers which are the most stable power amplifiers for this purpose.

Obviously many modifications and variations of the present invention are possible in the light of the above teachings. It is therefore to be understood that within the scope of the appended claims the invention may be practiced otherwise than as specifically described.

I claim:

1. A sweep generator for use with a regulated direct current power supply having three terminals providing a reference voltage and two distinct regulated positive voltages respectively relative to the reference voltage, the two positive voltages differing substantially from each other in magnitude, said sweep generator comprising a capacitor, a gating means for connecting one side of said capacitor to the higher positive terminal voltage of the power supply, said gating means being either very conductive or nonconductive in response to corresponding gate signal inputs thereto, a diode connected at its anode end to the other side of said capacitor for connecting the other side of said capacitor to the reference terminal of the power supply and serving as a low impedance path for capacitor charging current, whereby capacitor charging current may flow from the power supply through said gating means and said capacitor and said diode, in series, means of limited conductivity for conducting capacitor discharge current connected in parallel across said diode, additional means of limited conductivity connected to said one side of said capacitor for connecting said one side of said capacitor to the reference voltage terminal of the power supply, whereby capacitor discharge current flows through said first means of limited conductivity and said capacitor and said additional means of limited conductivity, and a second diode connected at its anode end to said one side of said capacitor for connecting said one side to the lower positive voltage terminal of the power supply to ensure that the capacitor always charges to said lower positive voltage before it commences to discharge.

2. A sweep generator as defined in claim 1, wherein said additional means of limited conductivity is a pentode whereby the capacitor discharge current therethrough is substantially constant.

3. A sweep generator as defined in claim 2, further including a feedback circuit having a two-section tandem-connected triode amplifier whose amplification is independent of filament voltage variation, and a differential amplifier in cascade therewith whose amplification is independent of plate voltage variation, the input end of said feedback circuit being connected across at least part of said first means of limited conductivity, the output end of said feedback circuit being connected to one grid of said pentode, whereby said feedback circuit opposes change in capacitor discharge current through said pentode from a predetermined level.

4. A sweep generator as defined in claim 3, further including a source of voltage connected across part of said first means of limited conductivity to apply a voltage which is a derivative of a desired sweep function, whereby said sweep generator will generate said desired sweep function.

5. A sweep generator for use with a regulated direct current power supply having two terminals providing a reference voltage and a regulated positive voltage relative to the reference voltage, respectively, said sweep generator comprising a capacitor, a gating means for connecting one side of said capacitor to the positive voltage terminal of the power supply, said gating means being either very conductive or nonconductive in response to corresponding gate signal inputs thereto, a diode connected at its anode end to the other side of said capacitor for connecting the other side of said capacitor to the reference terminal of the power supply and serving as a low impedance path for capacitor charging current, whereby capacitor charging current may flow from the power supply through said gating means, said capacitor, and said diode, in series, a resistance connected in parallel with said diode for conducting capacitor discharge current, a substantially constant current conducting means connected to said one side of said capacitor for connecting said one side of said capacitor to the reference terminal of the power supply for conducting capacitor discharge current, whereby capacitor discharge current flows through said resistance, said capacitor and said substantially constant current conducting means, in series, and a voltage source connected across a portion of said resistance to apply a voltage which is a derivative of a desired sweep function, whereby said sweep generator will generate said desired sweep function.

6. A sweep generator as defined in claim 5 wherein said substantially constant current conducting means is a pentode circuit, bias means for said pentode circuit including a feedback circuit responsive to change in voltage across said resistance to change the level of current flow through said pentode for holding constant the voltage across said resistance.

References Cited in the file of this patent

UNITED STATES PATENTS

| | | |
|---|---|---|
| 2,416,292 | Doddington | Feb. 25, 1947 |
| 2,419,606 | Stodola | Apr. 29, 1947 |
| 2,453,787 | Downs | Nov. 16, 1948 |
| 2,522,957 | Miller | Sept. 19, 1950 |
| 2,549,875 | Williams et al. | Apr. 24, 1951 |
| 2,562,188 | Hance | July 31, 1951 |
| 2,652,490 | Levy | Sept. 15, 1953 |
| 2,692,334 | Blumlein | Oct. 19, 1954 |
| 2,735,007 | McCurdy | Feb. 14, 1956 |

OTHER REFERENCES

U.S. Navy Dept.: Timing Circuits (Navships 900, 013) 1951, pp. 67, 68.

Soller et al.: Cathode Ray Tube Displays, 1948, pp. 261–270.